United States Patent Office 2,924,811
Patented Feb. 9, 1960

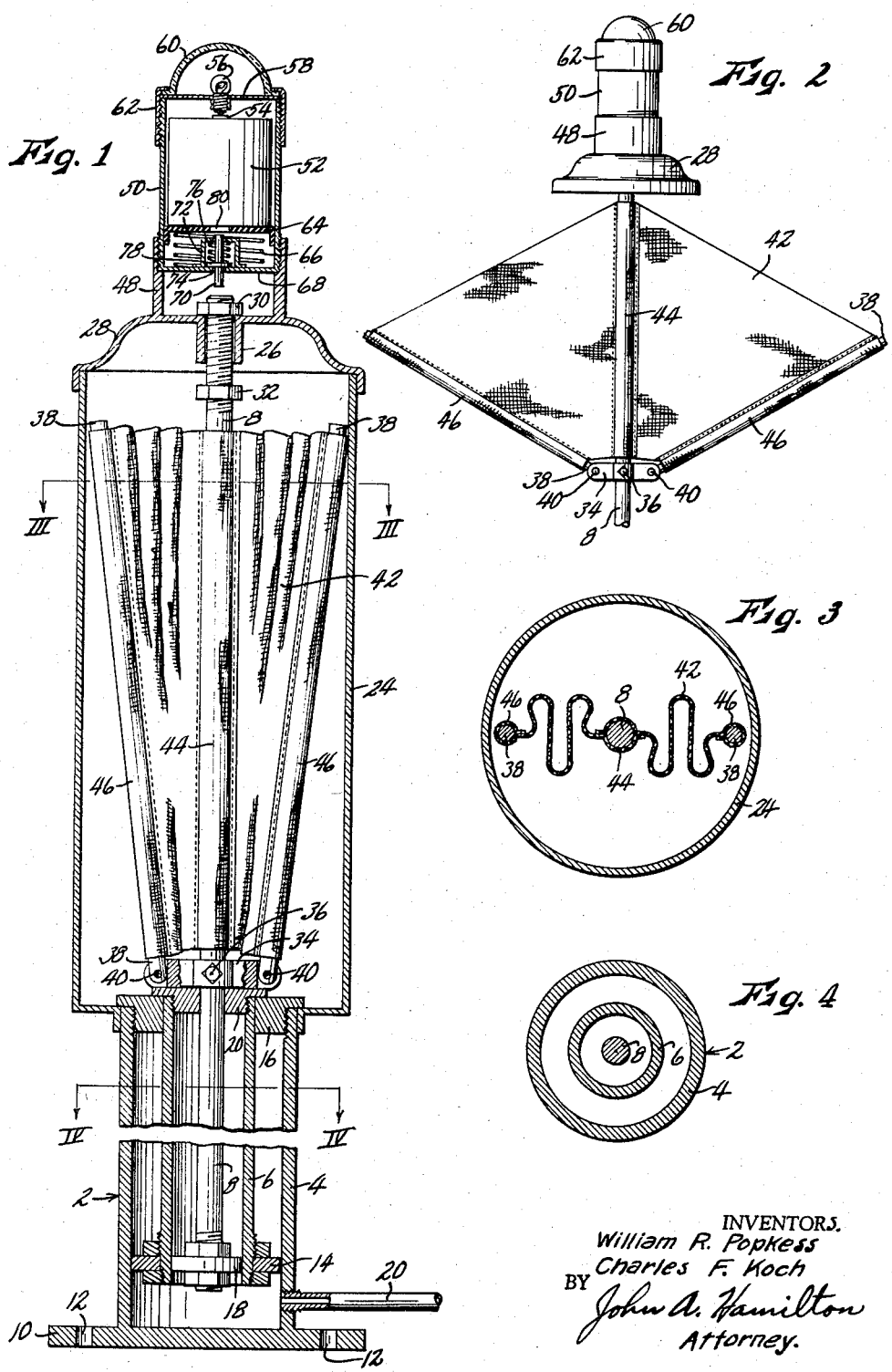

2,924,811

WARNING SIGNAL DEVICE

William R. Popkess and Charles F. Koch, Sabetha, Kans.

Application February 24, 1958, Serial No. 717,128

4 Claims. (Cl. 340—136)

This invention relates to new and useful improvements in warning signal devices, and has particular reference to a warning signal device particularly adapted for use on automotive vehicles.

The principal object of the present invention is the provision of a signal device adapted to be attached to a farm tractor or other slow-moving vehicle and adapted to be extended to position a warning element such as a lamp, flap or banner to a substantial height above the vehicle, or to be retracted to a much lesser height. When extended, which is intended primarily when the vehicle is being operated on a highway, the warning elements may be extended above any load the tractor may be pulling, so as to be visible to approaching vehicles. Also, when extended, the warning elements may be seen by approaching motorists at much greater distances over the tops of hills and rises, and this is important where motorists may be approaching at very high speeds, while the farm tractor is of necessity moving very slowly. Nearly every motorist has experienced the sudden fright of passing over the lip of a hill at high speed and finding a farm vehicle suddenly before him and moving so slowly as to appear motionless, with the result that he must apply his brakes dangerously suddenly and forcefully to avoid a collision, if there is no opportunity to pass the farm vehicle. The device must be retractable in order that the vehicle may pass under normal overhead obstructions, or enter garages, sheds and the like.

Another object is the provision of a warning signal device of the general class described wherein a flag or banner is incorporated as a warning element, and having provisions whereby said flag is automatically enclosed in a weatherproof protective housing whenever said device is retracted, and automatically unfurled from said housing whenever said device is extended.

Another object is the provision of a warning signal device of the general class described wherein an electric lamp is incorporated as a warning element, and with provisions whereby said lamp is automatically turned on and off respectively by the extension and retraction of said device.

Other objects are simplicity and economy of construction, efficiency and dependability of operation, and adaptability for use in a wide variety of applications.

With these objects in view, as well as other objects which will appear in the course of the specification, reference will be had to the drawing, wherein:

Fig. 1 is a foreshortened vertical mid-sectional view through a warning signal device embodying the present invention, with parts left in elevation and broken away for clarity, Fig. 2 is a side elevational view, to a reduced scale, of the warning elements of the device, shown in their extended position, and Figs. 3 and 4 are sectional views taken respectively on lines III—III and IV—IV of Fig. 1.

Like reference numerals apply to similar parts throughout the several views, and the numeral 2 applies generally to a standard composed three telescopingly engaged sections 4, 6 and 8. Outer section 4 is tubular in form, may be of any desired length, and is provided at its lower end with a flange 10 having bolt holes 12 formed therein whereby the standard may be secured in a generally vertical position to the frame or body of a farm tractor or the like. Disposed coaxially in section 4 is a second tubular section 6, said second section having a piston 14 secured to the lower end thereof which is slidably operable in section 4. Section 6 is also slidably supported in a bushing 16 threaded in the upper end of section 4. Third section 8 of the standard comprises a rod disposed axially in section 6, and provided at its lower end with a piston 18 which operates slidably in section 6, said rod also being guided in a bushing 20 threaded in the upper end of section 6. Suitable fluid under pressure, as from the hydraulic system of the farm tractor, or from any suitable pump, is introduced to the lower end of section 4 through a pipe 22, whereby when desired section 6 may be forced upwardly in section 4, and section 8 may be forced upwardly in section 6, to increase the height of the standard. The number of sections in the standard will of course be determined by the desired retracted height of the standard, and the desired maximum height thereof. When fluid is exhausted from standard section 4, the standard will of course be retracted to its telescoped length.

Standard section 4 is provided at its upper end with an upward extension 24 rigidly affixed thereto, said extension being cylindrically coaxial with the standard, and being open at its upper end. When the standard is fully retracted, as shown in Fig. 1, rod 8 extends upwardly through extension 24, and extends slidably through a bushing 26 formed centrally in a cap 28 which covers the upper end of extension 24. A pair of nuts 30 and 32 threaded on rod 8 permit limited sliding movement of said rod in bushing 26, for a purpose which will appear.

A cross-head 34 is secured to rod 8 as by set screw 36, so as to be disposed in the lower portion of extension 24 when the standard is fully retracted as in Fig. 1. Said cross-head extends horizontally, and an arm 38 is pivoted at its lower end to each end of said cross-head, the pivots being indicated at 40. Said arms extend generally upwardly from said pivots. A flag 42 formed of cloth or other suitable pliable material, and preferably red in color, is sewed to present a cloth tube 44 along its midline, said tube engaging rod 8, and cloth tubes 46 along its edges which are engaged respectively on arms 38. When arms 38 fall outwardly from rod 8 by gravity, flag 42 is unfurled as shown in Fig. 2, and this of course occurs whenever standard 2 is extended as previously described. When the standard is retracted, arms 38 are engaged and pivoted toward rod 8 by the wall of extension 24, whereby the flag is folded as shown in Fig. 1, and encased within extension 24, which provides a protective housing for said flag. During the final downward movement of rod 8, cap 28 engages and closes the upper end of extension 24, thereby protecting the flag against moisture and dirt, lengthening the life thereof. This unfurling and refolding of the flag of course occurs automatically, without attention from the operator, whenever the standard is extended or retracted.

Formed integrally with cap 28 is an upwardly opening circular cup 48 into which the upper end of rod 8 extends as shown. Threaded removably into cup 48 is a cylindrical lamp housing 50 which has the general nature of a self-contained flashlight. It may be of any suitable construction, comprising as shown a dry cell battery 52 carried in housing 50, the upper terminal 54 thereof contacting the base of an electric lamp bulb 56 which is secured in a circular reflector disc 58 covering the upper end of housing 50. A lens 60, preferably of a red color, is disposed over bulb 56, said lens and reflector plate 58 being secured to housing 50 by a threaded retainer ring 62. Dry cell 52 is forced upwardly to engage bulb 56 by an insulating disc 64 carried in the lower portion of housing 50 and urged upwardly by a spring 66 disposed between said disc and the bottom wall 68 of a housing 50.

A push button 70 is disposed movably in a bracket 72 affixed to the inner surface of wall 68, extending outwardly through a hole 74 formed in wall 68, and being urged resiliently outwardly by a spring 76 compressed between bracket 72 and a flange 78 of said push button. When the push button is pressed inwardly, the inner end thereof is elevated to extend through a central orifice 80 in insulating disc 64 to contact the base of dry cell 52. This completes a circuit from the cell base through push button 70, spring 76, bracket 72, housing 50, disc 58, and lamp 56 to top battery terminal 54, whereby the lamp is lighted. It will be understood that all of the parts just enumerated are electrical conductors, and that dry cell 52 is insulated from contact with housing 50.

It will be seen that push button 70 is in axial alignment with rod 8, and that these parts are so spaced that said rod will, during the lost motion thereof relative to cap 28 permitted by the spacing of nuts 30 and 32 relative to bushing 26 as rod 8 is extended upwardly from housing 24, press push button 70 upwardly to light lamp 56. Conversely, when the standard parts are again retracted to the position shown, cap 28 will again be engaged and supported by housing 24, and rod 8 will be lowered out of engagement with push button 70, and the lamp circuit interrupted. Thus the lamp operation is fully automatic, being turned on whenever the standard is extended to any substantial degree, and turned off whenever the standard is fully retracted. At the same time, lamp housing 50 may at any time be unscrewed from cup 48, whereupon it forms a self-contained light source of the general class of flashlights. The light may thus be utilized as a trouble light, or as a warning light to be placed on the road at substantial distances from the vehicle when it is necessary to stop the vehicle on a road, or for other purposes. Push button 70 may be pressed manually, or by resting the entire assembly base down on the ground or other suitable support.

While we have shown and described a specific embodiment of our invention, it will be readily apparent that many minor changes of structure and operation could be made without departing from the spirit of the invention as defined by the scope of the appended claims, and it is accordingly desired that our protection extend to and cover all subject matter falling properly within the scope of said claims.

What we claim as new and desire to protect by Letters Patent is:

1. A warning signal device comprising a standard consisting of a plurality of telescopingly engaged sections, means for securing the lowermost of said sections to an automotive vehicle, means for extending said standard telescopingly, a warning element constituting a flag secured along its midline to the topmost standard section, a plurality of arms pivoted to said topmost standard section and movable outwardly therefrom by gravity, the outer edges of said flag being secured to said arms whereby outward movement of said arms will unfurl said flag, a protective flag housing fixed to the lowermost standard section and being open at the top, said topmost standard section extending vertically through said housing and said flag being encased within said housing when said standard is retracted, whereby when said standard is extended said flag will be elevated above said housing and unfurled by outward movement of said arms, the span of said arms when said flag is unfurled being greater than the horizontal dimensions of said flag housing, whereby when said standard is retracted, said housing will engage and pivot said arms toward said topmost standard section to fold said flag.

2. A warning signal device comprising a standard consisting of a plurality of telescopingly engaged sections, means for securing the lowermost of said sections to an automotive vehicle, means for extending said standard telescopingly, a lamp housing carried at the upper end of said topmost standard section for limited vertical movement with respect thereto, an electric lamp mounted in said housing, an operative circuit for said lamp including an electric switch carried by said housing, said lamp housing being supported by the lowermost standard section when said standard is retracted, the relative vertical motion which occurs between said topmost standard section and said lamp housing, when said standard is extended, being operable to close said switch.

3. The structure as recited in claim 2 wherein said operating circuit includes an electric battery, said battery, lamp and switch being carried in said lamp housing, said lamp housing being detachably connected to said topmost standard section whereby to be removable therefrom to serve as a self-contained lighting unit.

4. A warning signal device comprising a standard consisting of a plurality of telescopingly engaged sections, means for securing the lowermost of said sections to an automotive vehicle, means for extending said standard telescopingly, a flag secured to the topmost standard section, a protective flag housing fixed to the lowermost standard section and being open at the top, said topmost standard section extending vertically through said flag housing whereby said flag is encased in said flag housing when said standard is retracted, a cap secured to the upper end of said topmost standard section for free but limited vertical movement with respect thereto, said cap closing the open top of said flag housing when said standard is fully retracted, a lamp housing carried by said cap, an electric lamp mounted in said lamp housing and an operative circuit for said lamp including an electric switch mounted on said lamp housing, said topmost standard section being operable, during the lost motion thereof relative to said cap as said standard is extended, to close said switch.

References Cited in the file of this patent

UNITED STATES PATENTS 1,695,843   Goff _____ Dec. 18, 1928

FOREIGN PATENTS 368,178   France _____ Sept. 28, 1906